March 27, 1951  E. D. MATTIX ET AL  2,546,673
FLOW CONTROL VALVE

Filed July 13, 1946  2 Sheets-Sheet 1

EMORY D. MATTIX
CHARLES W. STOKES
INVENTORS.

BY Lester B. Clark
Ray L. Smith
ATTORNEYS

March 27, 1951 — E. D. MATTIX ET AL — 2,546,673
FLOW CONTROL VALVE
Filed July 13, 1946 — 2 Sheets-Sheet 2

EMORY D. MATTIX
CHARLES W. STOKES
INVENTOR.

BY Lester B. Clark
Ray L. Smith
ATTORNEYS

Patented Mar. 27, 1951

2,546,673

UNITED STATES PATENT OFFICE 2,546,673

FLOW CONTROL VALVE

Emory D. Mattix and Charles W. Stokes,
Lake Charles, La.

Application July 13, 1946, Serial No. 683,478

5 Claims. (Cl. 138—45)

1

This invention relates to a device for adjustably and efficiently controlling the rate of flow of fluid in a conduit or pipe line in which it is installed.

An object of the invention is to provide a Venturi type of valve of novel construction, and in which the Venturi tube or passage within the valve body is variable whereby the rate of flow of fluid through the valve may be controlled.

Another object is to provide a valve comprising a body having a Venturi assembly therein, such assembly being adapted to flex in a preselected manner whereby the Venturi passage through the body is adjusted to control the rate of flow of fluid therethrough.

Still another object of the invention is to provide a valve of the Venturi type and in which a composite Venturi assembly is connected to an actuator extending to the exterior of the valve housing, said actuator being movable to vary the Venturi passage through the valve.

The foregoing are primary objects, which together with other objects and advantages of the invention will be more readily apparent when the following description is considered in connection with the accompanying drawings wherein.

Figure 1:
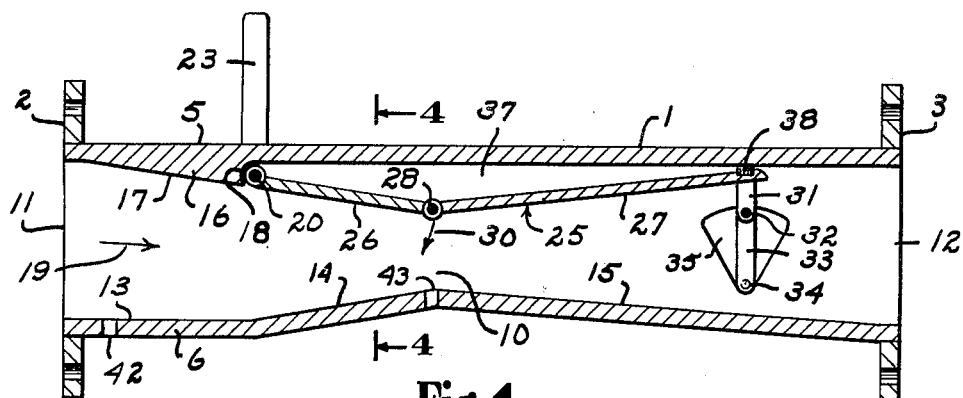
Fig. 1 is an elevational view in section through one form of the invention.
Figure 2:
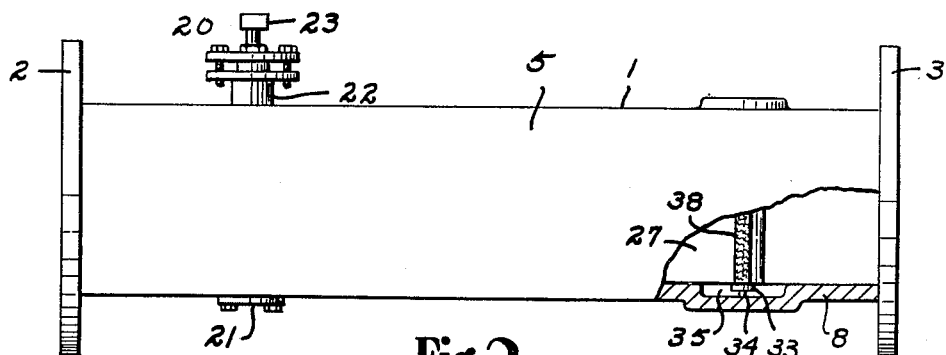
Fig. 2 is a plan view of the valve, a portion thereof being cut away to more clearly illustrate certain constructional features.

An embodiment of the invention as shown in the drawings comprises a body 1 provided with end flanges 2 and 3 whereby the valve may be secured in a pipe line or attached to the outlet of a conduit in which the rate of flow is to be controlled. The body 1 is generally rectangular in cross section having top and bottom walls 5 and 6, and side walls 7 and 8.

The body may be formed initially as a unitary

2 structure or the walls thereof may, as shown, comprise platelike members which are secured together in a suitable manner such as by welding.

In order to provide desired control of flow of fluid through the Venturi body 1, arrangement is made to provide a variable throat 10, it being intended that control variation in the cross section of the throat will be instrumental in providing a desired rate of fluid flow from the inlet 11 to the outlet 12.

The side walls 7 and 8 are preferably parallel whereby the width of the passage through the valve is constant. The height of the passage is, however, variable by virtue of structural features to which attention will now be directed.

The bottom wall 6 may present an internal plane surface, but improved flow lines are had when the entrance surface 13 is substantially parallel to the direction of flow as indicated by the arrow 19 while the surface 14 is inclined to the throat 10 whence the oppositely inclined surface 15 leads outwardly to the flange 2 at the outlet 12.

The upper wall 5 is thickened at 16 to provide inclined surface 17 which terminates in the arcuate surface 18 concentric with the shaft 20 which has one end journaled in the cap 21 at one side of the body and which passes through the stuffing box 22 at the other side of the body. Actuating means for the shaft 20 such as the handle 23 is attached to the shaft outwardly from the stuffing box 22. This feature of construction enables selective rotation of the shaft to serve a purpose that will presently appear.

The Venturi plate assembly 25 comprises plates 26 and 27 which are pivotally interconnected at 28. The outermost end of the plate 26 is fixed upon the shaft 20 so that movement of the lever 23 will effect movement of the pivot 28 in the direction indicated by the arrow 30.

The outer end of the plate 27 has ears 31 which are attached through pivots 32 to arms 33 in turn pivoted upon pins 34 in the side walls 7 and 8 of the body. The arms 33 are located within recesses 35 in the side walls so as to minimize obstruction to flow of fluid through the valve.

Figure 3:
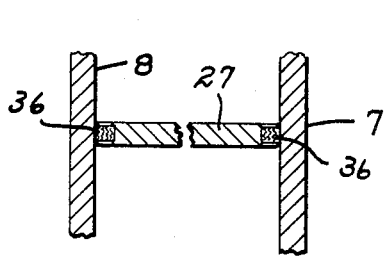
Fig. 3 is a detail sectional view showing the manner of providing a seal between the Venturi baffle and the side walls of the valve body.
Figure 4:
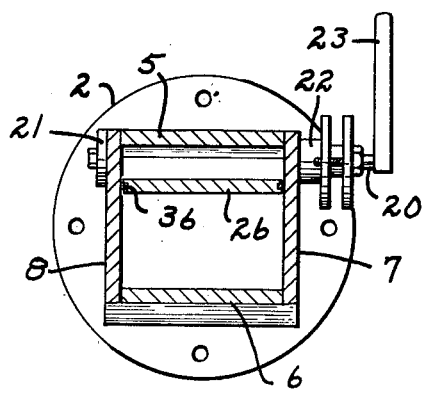
Fig. 4 is a sectional view taken on line 4—4 in Fig. 1.

As is best seen in Fig. 3 the plates 26 and 27 of the Venturi assembly 25 are provided with grooves in their edges to receive packing 36 whereby there is formed a seal with the side walls. While leakage of fluid into the chamber 37 above the Venturi assembly is not highly undesirable, it is preferable that flow to and from this chamber be restricted so that foreign matter cannot enter and become lodged between the component parts of this portion of the device.

The upper surface of the plate 27 is also grooved transversely to receive packing 38 which, with the packing 36, forms a continuous seal with the side walls and the top of the body 1.

Figure 5:
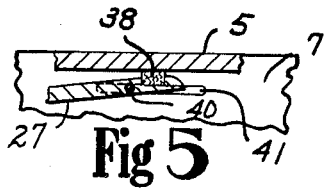
Fig. 5 is a detail showing an alternate construction whereby the outer end of the Venturi baffle is movable and yet maintains a seal with the adjacent valve housing.

An alternate construction for movably supporting the outer end of the plate 27 is shown in Fig. 5. In this construction a pin 40 passes transversely through the plate 27 and the ends of this pin enter longitudinally extending slots 41 in the inner surfaces of the side walls 7 and 8. The end of the plate can therefore move for a limited distance as the lever 23 is actuated to effect desired enlarging or reducing of the size of the throat 10 to control the flow of fluid through the valve. The packing 38 will, of course, possess sufficient resiliency that a seal with the member 5 is maintained for all settings of the Venturi assembly.

The operation of the device heretofore described as an illustrative embodiment of the invention is believed apparent. By way of summary and amplification of the disclosure, it will be assumed that the device is attached to the end of a conduit or is connected in a pipe line in which the rate of flow of fluid is to be controlled.

If it is desired that flow in the line be unobstructed, the lever 23 will, of course, be moved to the left as shown in Fig. 1 whereby the throat 10 will be of a maximum cross section. It is apparent of course, that the various surfaces contacted by the flowing fluids are free from any abrupt changes in direction and that there will therefore be a minimum of resistance to the flow of the fluid. If on the other hand, the rate of flow is to be restricted, the arm 23 will be moved to the right whereby the throat 10 will be decreased in cross sectional area. The setting of the handle 23 will be such that the desired rate of flow is maintained.

While relatively constant conditions are maintained in the line in which the device is used, it is apparent that a calibration can be provided to indicate the setting of the lever 23 to maintain a given rate of flow. Alternately, of course, differential pressure indicating means may be connected to the openings 42 and 43, and calibration information be had to indicate the setting of the handle 23 for desired conditions of flow.

A form of the Venturi valve comprising a modification of that just described is shown in Fig. 3. In this form the plate 27 is omitted and the bottom 6 of the valve body may be flat, an inclined baffle 29 being mounted transversely of the body to cooperate with the plate 26 to form the throat 10 which varies in cross section as the lever 23 is moved as indicated by the arrow 39 to and from the full line position.

Figure 6:
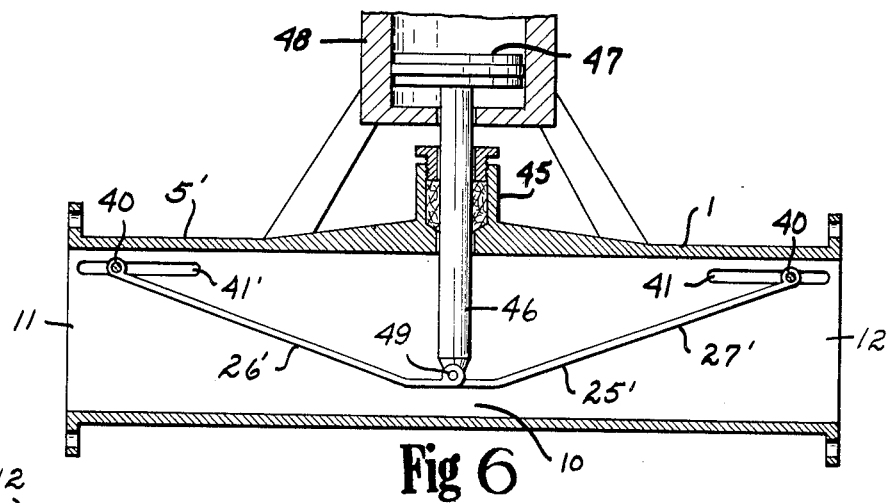
Fig. 6 is an elevational view in section through a modified form of the invention.

In the modification shown in Fig. 6 the upper wall 5' of the body 1 is provided with a boss 45 forming a packing gland through which passes the actuator rod 46 attached to a piston 47 slidable within the cylinder 48 under the force exerted by a pressure fluid from a suitable source (not shown).

The Venturi assembly 25' comprises articulated plates 26' and 27' pivotally attached to the lower end of the body rod 46 at 49. The outer ends of these plates have pins 40 which fit slidably in the slots 41 so that axial movement of the rod 46 will vary the throat 10 while the loose connection formed by the pins 40 in slots 41 permit necessary relative movement between the plates and the body 1.

Inasmuch as the fluid flowing through the valve between the inlet 11 and the outlet 12 exerts an upward force upon the Venturi assembly 25', it seems apparent that the setting of the valve is maintained by exerting a predetermined pressure upon the piston 47. If it is desired that the assembly shall be resiliently held in place, the requisite force will be exerted by means of a gaseous fluid such as compressed air or the like. If, on the other hand, a fixed position of the assembly is to be maintained, an incompressible fluid or liquid will be used as the actuating medium.

Figure 7:
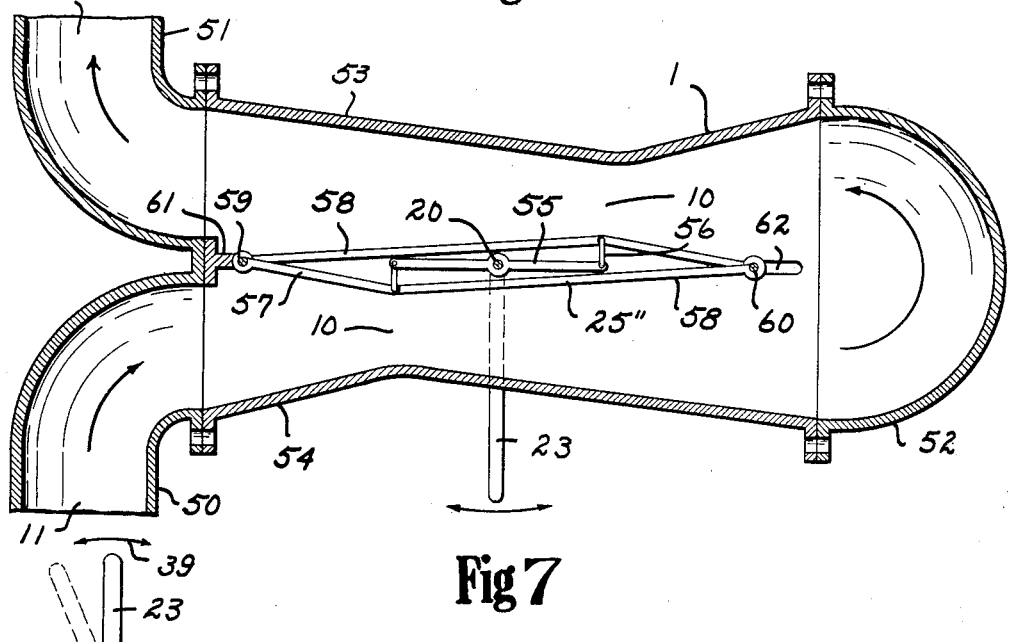
Fig. 7 is a vertical sectional view through a two stage form of the invention.
Figure 8:
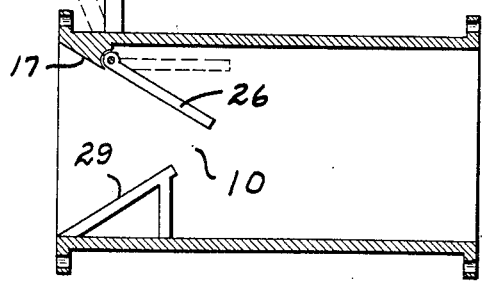
Fig. 8 is a sectional view of a simplified form of the invention.

The invention may also assume the form of a double venturi as shown in Fig. 7 wherein the body 1 is provided with an inlet 50 and an outlet 51 at one end while the opposite end is closed as by the cap member 52. The upper and lower walls 53 and 54 are tapered inwardly to form throats 10 which vary in cross section as the Venturi assembly 25'' is actuated by means of the lever 23 which is attached exteriorly of the valve body to the shaft 20. This shaft is attached within the valve body to cross arm 55 which is in turn connected through links 56 to the respective pairs of plates 57 and 58. The outer ends of these paired plates are interconnected by means of the pivot pins 59 and 60 of which the former is fixed to fulcrum within the projection 61 on the interior of the valve body. The pin 60 extends sidewardly from the plates interconnected thereby, and enters the slot 62 whereby there is provided a loose connection to permit slight axial movement as the lever 23 is moved to effect desired cross section of the throats 10. The links 56 are of such length that they exert the necessary force transversely of the body 1 as the Venturi assembly is moved from the outermost to the innermost positions.

Broadly the invention comprehends a Venturi type of valve of simple and efficient construction for desirably controlling the rate of flow in a pipe line.

The invention claimed is:

1. A flow control valve of the Venturi type comprising, an elongated body having a passage therethrough of substantially rectangular cross section and adapted to be connected to a conduit through which fluid flow is to be controlled, a shaft extending transversely of said passage, means exteriorly of the housing for rocking the shaft, a Venturi assembly comprising at least one plate slidably fitting between the side walls of the passage, and means interconnecting said shaft and plate for tilting said plate a predetermined amount when the shaft is rocked to control the cross section of the throat within the valve body.

2. In a flow control valve of the Venturi type, a body having a passage therethrough of substantially rectangular cross section, a Venturi assembly in said passage, said assembly comprising at least two interconnected plates extending transversely of the passage and at one side thereof, and means for selectively moving the interconnected ends of the plates toward and from the opposite side of the passage to control the rate of flow of fluid through the Venturi passage formed within the body.

3. A Venturi type control valve comprising, a body having a passage therethrough of substantially rectangular cross section, a shaft extending transversely of said passage at one side thereof, means exteriorly of the housing for rocking said shaft, and a Venturi plate secured to said shaft and slidably fitting between the side walls of the passage, whereby a throat of variable cross section is formed at the free end of the plate and the cross section of the passage is varied to control the rate of flow through the valve.

4. A flow control valve comprising, a body having a passage therethrough of substantially rectangular cross section, a shaft extending transversely of the passage at one side thereof and proximate the entrance to the passage, means exteriorly of the housing for rocking said shaft to preselected angular positions, a Venturi plate secured to said shaft and slidably fitting between the side walls of the passage, a second plate having one end pivotally connected to the free end of said first mentioned plate, and means for holding the other end of said second plate in close proximity to the wall of the body so that a diverging passage is formed between the throat formed at the interconnected ends of the plates and the outlet end of the body.

5. A flow control valve comprising, a body having a passage therethrough of substantially rectangular cross section, a shaft extending transversely of the passage at one side thereof and proximate the entrance to the passage, means exteriorly of the housing for rocking said shaft to preselected angular positions, a Venturi plate secured to said shaft and slidably fitting between the side walls of the passage, a second plate having one end pivotally connected to the free end of said first mentioned plate, and means for holding the other end of said second plate in close proximity to the wall of the body so that a diverging passage is formed between the throat formed at the interconnected ends of the plates and the outlet end of the body, said last mentioned means comprising an arm pivotally connected to the body and the second plate respectively.

EMORY D. MATTIX.
CHARLES W. STOKES.

REFERENCES CITED

The following references are of record in the file of this patent:

UNITED STATES PATENTS

| Number | Name | Date |
|---|---|---|
| 1,635,040 | Fales | July 5, 1927 |
| 2,424,654 | Gamble | July 29, 1947 |